June 17, 1930. G. S. KECK ET AL 1,764,171
DIRIGIBLE HEADLIGHT
Filed Aug. 15, 1927   2 Sheets-Sheet 2
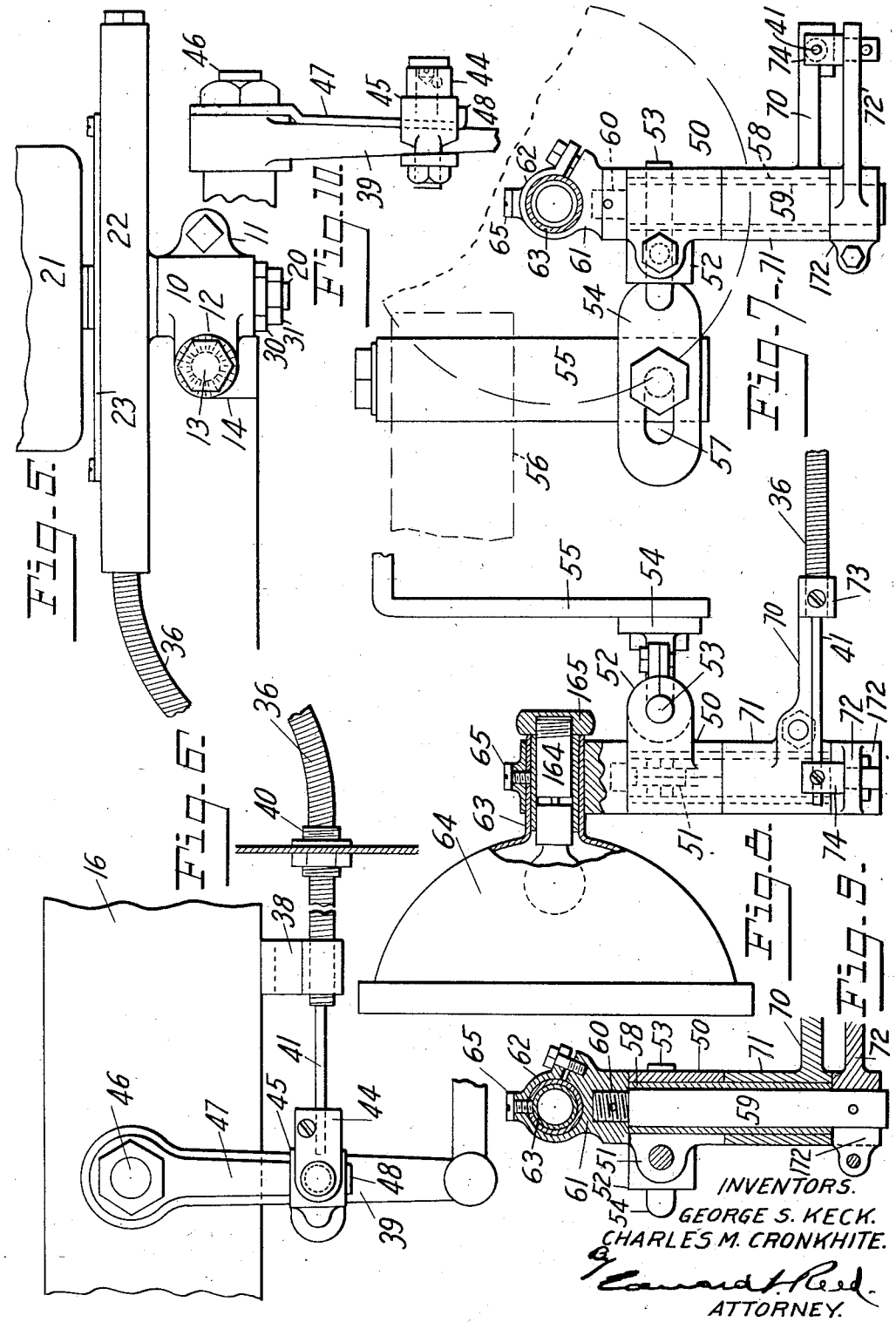
INVENTORS.
GEORGE S. KECK.
CHARLES M. CRONKHITE.
ATTORNEY.

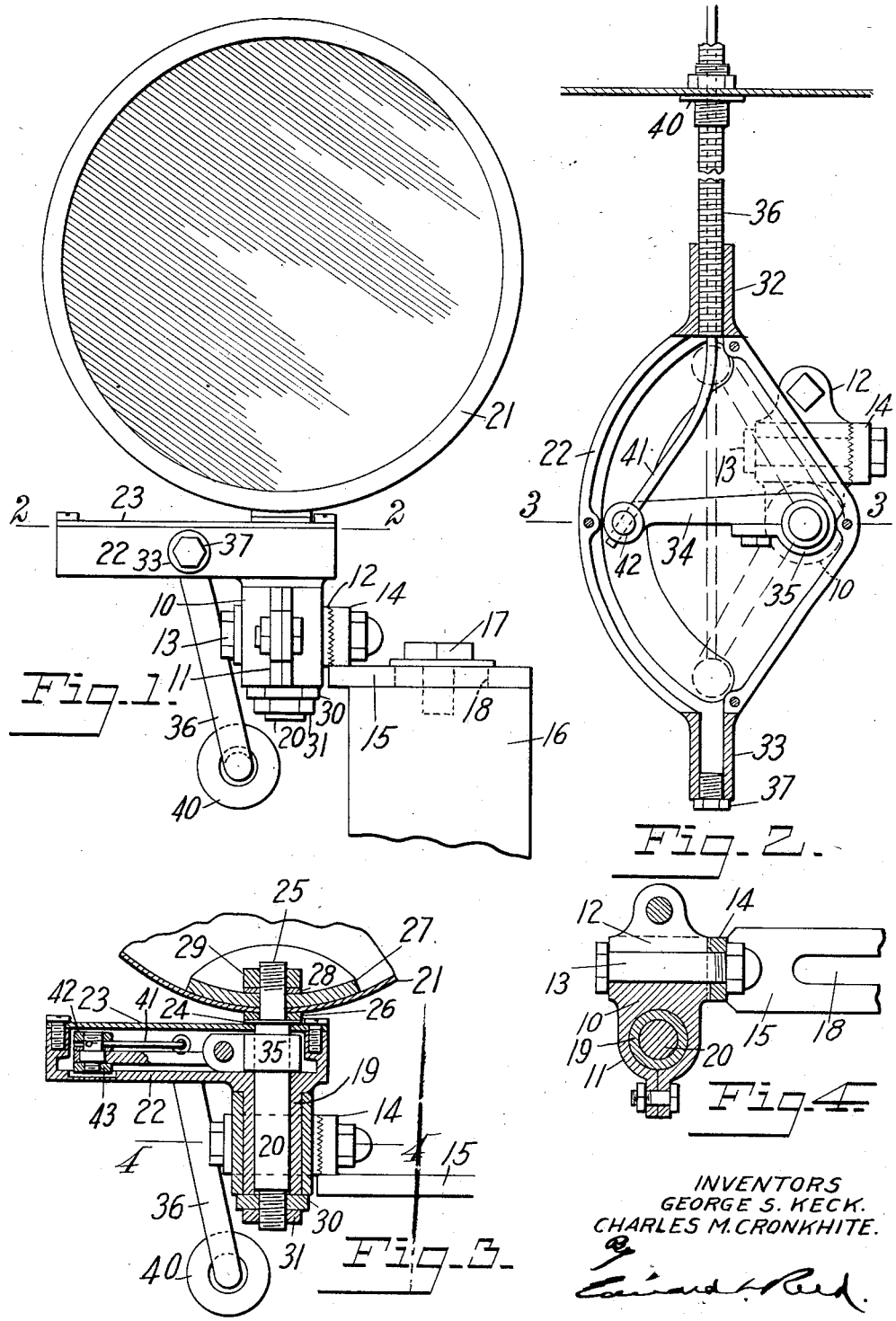

Patented June 17, 1930

1,764,171

UNITED STATES PATENT OFFICE

GEORGE S. KECK, OF PASADENA, AND CHARLES M. CRONKHITE, OF GLENDALE, CALIFORNIA, ASSIGNORS TO PILOT RAY CORPORATION, OF WILMINGTON, DELAWARE, A CORPORATION OF DELAWARE

DIRIGIBLE HEADLIGHT

Application filed August 15, 1927. Serial No. 213,000.

This invention relates to dirigible headlight mechanism for automobiles and the like.

One object of the invention is to provide a complete headlight mechanism which can be quickly and easily installed upon cars of various kinds and which will be simple in its construction and inexpensive to manufacture.

A further object of the invention is to provide such a headlight mechanism comprising an actuating device which will accommodate itself to varying distances between the support for the headlight and the part of the steering mechanism from which the actuating device derives its movement.

A further object of the invention is to provide a headlight mechanism comprising a device for supporting the headlight on the frame of the automobile and which will permit the headlight to be adjusted to different positions with relation to the automobile, without affecting the operative connection between the headlight and the steering mechanism.

Other objects of the invention will appear as the mechanism is described in detail.

In the accompanying drawings Fig. 1 is a front elevation of a headlight embodying our invention; Fig. 2 is a sectional view taken on the line 2—2 of Fig. 1; Fig. 3 is a transverse section taken on the line 3—3 of Fig. 2; Fig. 4 is a section taken on the line 4—4 of Fig. 3; Fig. 5 is a side elevation of the supporting mechanism for the headlight with the headlight partly broken away; Fig. 6 is a side elevation of a portion of the automobile frame and steering mechanism showing the connection between the actuating device and the steering mechanism; Fig. 7 is a front elevation of a modified form of mounting for the headlight; Fig. 8 is a side elevation of the mounting shown in Fig. 7, partly broken away; Fig. 9 is a vertical sectional view taken centrally through the mounting of Fig. 7; and Fig. 10 is a side elevation of the clamp for connecting the wire with the steering arm.

In these drawings we have illustrated two embodiments of our invention, both of which embody the same essential features of construction and operation but differ in the details of their construction and in the arrangement of the parts. It will be understood that these embodiments have been chosen for the purpose of illustration only and that the mechanism may take various forms and the various parts thereof may be arranged in various ways without departing from the spirit of the invention.

In that form of the invention illustrated in Figs. 1 to 6, we have shown the mechanism as comprising a supporting structure 10 adapted to support the headlight for movement about a vertical axis and which is of such a character that the headlight may be adjusted with relation thereto and with relation to the frame of the automobile upon which the supporting structure is mounted. As here shown, this supporting structure comprises two split sleeves 11 and 12 formed in a single piece and extending at right angles one to the other. The split sleeve 12 is arranged in a substantially horizontal position and is carried by a rod or bolt 13 which extends through the same and through a lug or upright portion 14 of a bracket 15 adapted to be mounted upon the frame or other part of an automobile. In the present instance, this bracket is shown as mounted directly upon one of the side members of the automobile frame, a portion of which is shown at 16, to which the bracket is secured by means of a bolt 17. In order to permit the supporting structure to be adjusted toward and from the frame member 16 the bracket has a longitudinal slot 18 through which the bolt 17 extends, thereby enabling it to be secured in different positions with relation to the frame member. The supporting rod or bolt 13 is rigidly secured to the bracket so as to be held against rotation with relation thereto and the split sleeve 12 is clamped tightly about the rod or bolt, thus holding the supporting structure 10 against movement about the rod or bolt. By loosening the split sleeve the supporting structure can be adjusted with relation to the bolt and to the frame member 16 to cause the second or vertical split sleeve 11 to be tilted.

Mounted within the vertical split sleeve 11 and clamped tightly therein so as to be held normally against movement with relation thereto is a sleeve or elongated bearing 19 within which is journaled a shaft 20 upon which is mounted the headlight 21. In the present construction a shallow horizontally arranged housing 22 is rigidly secured to the sleeve or bearing 19 and may, if desired, be formed integral therewith. The bottom wall of this housing has an opening through which the shaft 20 passes and in the construction shown this opening forms a part of the bearing for the shaft. The top wall 23 of the housing is detachably secured thereto so that it may be removed to permit access to be had to the interior of the housing. This top plate or wall 23 has an opening arranged in line with the bearing 19 and through which the upper portion of the shaft 20 extends. A washer 24, preferably of composition or other packing material, is mounted about the upper portion of the shaft and overlaps that portion of the top plate 23 of the housing which surrounds the opening so as to provide a closure or seal therefor. The upper end portion of the shaft is reduced in diameter to provide a shoulder on the shaft and is screw threaded, as shown at 25. Mounted about this screw threaded portion of the shaft is a plate or clamping member 26 which contacts with the washer 24 and exerts sufficient pressure thereon to hold the same snugly in contact with the outer surface of the top plate of the housing. The upper surface of the plate or clamping member 26 is shaped to conform to the contour of the lower portion of the casing of the headlight 21, and this casing is provided with an opening through which the threaded portion 25 of the shaft extends and the casing rests upon the clamping plate 26. A reinforcing or stiffening member 27 is rigidly secured to the inner surface of the casing of the headlight, surrounding the shaft, and has its central portion adjacent to the shaft flattened to receive a washer or second clamping member 28. A nut 29, which is threaded onto the portion 25 of the shaft, serves to force the clamping member 28 against the reinforcing plate 27 and to force the clamping member 26 against the shoulder of the shaft so that the headlight casing will be clamped firmly between the two clamping members 26 and 28, thereby rigidly connecting the headlight with the shaft for rotation therewith. The shaft is held against vertical movement in the sleeve or bearing 19 by means of a nut 30 screw threaded onto the reduced lower end portion of the shaft and contacting with the lower end of the bearing. The nut 30 is locked against movement by a jam nut 31.

The housing 22 is of a flat shallow character and has one side wall adjacent to the bearing or sleeve portion 19 thereof and has its other wall curved and spaced a considerable distance from that bearing. The front and rear portions of the housing project considerable distances beyond the bearing 19 and are provided with openings, preferably in the form of tubular extensions 32 and 33. Connected with the shaft 20 is an operating arm 34 which, in the present instance, is arranged within the housing 22 and rigidly secured to the shaft. The connection may take various forms but, as here shown, the inner end portion or hub 35 of the operating arm or lever 34 is in the form of a split sleeve which is clamped tightly about the shaft so as to secure the arm normally in fixed relation to the shaft but which may be loosened to permit the arm to be adjusted with relation to the shaft. This hub or sleeve portion of the operating arm rests upon the bottom wall of the housing, at the upper end of the bearing 19 and by adjusting the arm 34 and the nut 30 on the shaft the vertical position of the shaft may be varied.

Any suitable actuating device may be interposed between the operating arm 34 and the movable part of the steering mechanism but it is desirable that this actuating device shall be of such a character that it will accommodate itself to varying distances between the supporting structure for the headlight and that part of the steering mechanism with which it is connected, thus enabling the mechanism as a unit to be mounted on automobiles of various kinds without modification either in the headlight unit itself or in the automobile. For this purpose we prefer to utilize a flexible operating device of the type commonly known as a Bowden wire. This device comprises a flexible tube or sheath 36 one end of which is anchored at a point adjacent to but spaced from the supporting structure 10. As here shown, one end of the sheath is inserted in the opening in one end of the housing 22 and is rigidly secured to the tubular extension in which that opening is formed. It will be noted that the housing has such an opening at each end so that the headlight may be mounted at either side of the automobile and the actuating device connected with the rear end thereof. That opening in the housing which is not in use may be closed by a plug, as shown at 37. The other end of the sheath 36 is carried rearwardly and is anchored to a fixed part of the automobile adjacent to a movable part of the steering mechanism. In the present device, this rear end of the sheath is mounted in a clip 38 which is rigidly secured to the frame member 16 of the automobile adjacent to the swinging arm 39 of the steering mechanism. Preferably this sheath is passed through the apron forming part of the fender adjacent to the supporting structure so that it will be carried rearwardly beneath the fender and, if desired, a thimble 40 may be inserted in the fender to provide a suitable support for the sheath at that point. Extending through the sheath 36 and beyond each end thereof is a wire 41 which is connected at its forward end with the operating arm 34 and at its rear end with the arm 39 of the steering mechanism. The wire is slidably mounted in the sheath, which prevents the same from buckling, and the thrust or pull exerted upon the wire by the steering mechanism will be transmitted to the operating arm 34 and through the shaft 20 to the headlight, thereby causing the headlight to be turned in the direction in which the front wheels of the automobile are turned. Preferably the wire 41 has swiveled connection with the operating arm and, as here shown, is anchored in the end of a stud 42 which is rotatably mounted in a suitable opening in the arm 34 and which is secured therein by means of a nut 43. The rear end of the wire 41 is anchored in a connecting member or socket 44 which is pivotally mounted on a clamp 45 secured to the arm 39 of the steering mechanism. This arm is usually tapered and to hold the clamp 45 against movement, we have mounted on the end of the shaft 46, which carries the arm 39, a flat metallic strip or plate 47 which extends along the arm 39 and between the same and the clamp 45 and has its lower end bent outwardly, as shown at 48, to engage the lower edge of the clamp and prevent the downward movement thereof.

In Figs. 7, 8 and 9, we have illustrated a modified form of headlight mounting which comprises a supporting structure 50 consisting of vertical and horizontal split sleeves, 51 and 52, similar to the supporting structure above described. The horizontal split sleeve 52 is supported by a rod 53 which is rigidly secured to, and in the present instance is an integral part of, a bracket 54, the rod or extension 53 of the bracket being offset from the body portion thereof, as shown in Fig. 8. The bracket 54 is secured to a depending member or iron strap 55 which is rigidly mounted on the frame 56 of the automobile. This supporting strap 55 is usually employed when the headlight is to be mounted on an automobile the frame of which is not provided with spring horns. The bracket 54 is slotted, as shown at 57, to permit of the adjustment of the supporting structure with relation to the automobile frame. By loosening the split sleeve 52 the supporting structure can be adjusted about the axis of the rod or extension 53 of the bracket to tilt the supporting structure. Rigidly mounted in a vertical split sleeve 51 is an elongated sleeve or bearing member 58, the upper end of which terminates substantially flush with the upper end of the split sleeve and the lower portion of which extends a considerable distance beyond the lower end of the split sleeve. Journaled in this sleeve or bearing 58 is a shaft 59 the upper end of which projects a short distance beyond the bearing and is reduced and provided with screw threads, as shown at 60. Mounted on the shaft is a connecting member 61, which may be of any suitable form, the one here illustrated having a screw threaded socket to receive the screw threaded end of the shaft and this connecting member is preferably pinned to the shaft. The upper portion of the connecting member is in the form of a horizontal split sleeve 62 through which extends a stem 63 of the casing of the headlight 64, this stem being firmly clamped in place by tightening down the split sleeve. Arranged within this stem is the lamp socket which receives the base of the electric lamp. This lamp socket is adjustable lengthwise of the stem for the purpose of focusing the lamp and a set screw 65 is threaded into the wall of the split sleeve, extends through the wall of the stem 63 and engages the socket to secure the lamp in its focused positions. A contact member or plug 164 is mounted in the stem 63 and has its outer end threaded to receive a cap 165, which closes the end of the split sleeve and forms a finger piece for adjusting the socket.

Rigidly but adjustably secured to the sleeve or bearing 58 is an arm 70 which, in the present instance, is carried by a split sleeve 71 clamped about the sleeve 58 so as to retain the arm 70 in a fixed position with relation to that sleeve. The shaft 59 projects below the lower end of the sleeve or bearing 58 and rigidly but adjustably secured to the lower end of the shaft, preferably by means of a split sleeve 172, is an operating arm 72. The actuating device is similar to that above described and the sheath 36 is anchored in a clip 73 at the outer end of the arm 70 and the wire 41 is anchored in a stud 74 which is rotatably mounted in the outer end of the arm 72, thus the end of the sheath is held rigidly against movement with relation to the supporting structure and the movement of the wire will be transmitted to the shaft 59.

The operation of the headlight mechanism will be readily understood from the foregoing description and it will be apparent that we have provided a mechanism of this kind which is very simple in its construction and operation and which can be produced at a low cost and, further, that the mechanism as a unit is of such a character that it may be mounted on automobiles of various kinds. The lamp supporting structure can be mounted on the frame or any other suitable part of the automobile structure and the actuating device is of such a character that it will automatically accommodate itself to varying distances between the headlight supporting structure and the steering arm, or other part of the steering mechanism with which the actuating device is connected. The bending or distorting of the sheath 36 in no way interferes with the operation of the wire 41 and consequently it is immaterial whether the sheath is straight or contains various turns. Further, the headlight may be mounted at either side of the automobile or by mounting it on the cross bar which forms a part of many automobile structures it can be mounted centrally thereof. It will be obvious that a headlight may be provided at each side of the automobile by a mere duplication of the mechanisms here shown. If desired, the actuating wires of two such mechanisms may be attached to the same clamping member on the steering arm.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent, is:

1. In a dirigible headlight mechanism, a supporting structure comprising rigidly connected split sleeves extending transversely one to the other, one of said sleeves being adapted to engage a part carried by an automobile, a tubular member mounted in the other of said split sleeves, a shaft journaled in said tubular member and having means for securing a headlight thereto, an actuating member mounted on said shaft for adjustment lengthwise thereof and adapted to engage one end of said tubular member, means adjustably mounted on said shaft and engaging the other end of said tubular member to hold said shaft against lengthwise movement, and means for operatively connecting that actuating member with a part of the steering mechanism of said automobile.

2. In a dirigible headlight mechanism, a supporting structure having means for mounting the same on a part of an automobile and comprising a clamp, a tubular member mounted in said clamp and held normally against movement with relation thereto, a shaft journaled in said tubular member and having means for securing a headlight thereto, an actuating arm rigidly secured to said shaft for rotating the same, a laterally extending member rigid with said tubular member and separate from said supporting structure, and an operating device comprising a flexible sheath having one end anchored to said laterally extending member, and a wire extending through said sheath, beyond said end thereof and connected with said actuating arm.

3. In a dirigible headlight mechanism a tubular member, means for rigidly mounting said member on a part of an automobile, a laterally extending housing rigidly supported by said tubular member, a shaft journaled in said tubular member and extending through said housing and having means for securing a headlight thereto, an actuating arm secured to said shaft and arranged within said housing, and an operating device comprising relatively movable parts connected respectively with said housing and said actuating arm.

4. In a dirigible headlight mechanism a tubular member, means for rigidly mounting said member on a part of an automobile, a laterally extending housing rigidly supported on the upper end of said tubular member, a shaft journaled in said tubular member, extending through said housing and having means for connecting a headlight to the upper end thereof, an actuating arm arranged within said housing and having one end rigidly secured to said shaft, and an operating device comprising a flexible sheath having one end anchored in the wall of said housing and a wire extending through said sheath and connected with said actuating arm.

In testimony whereof, we affix our signatures hereto.

GEORGE S. KECK.
CHARLES M. CRONKHITE.